United States Patent [19]

Christensen

[11] Patent Number: 5,062,116
[45] Date of Patent: Oct. 29, 1991

[54] HALOGEN-COMPATIBLE HIGH-FREQUENCY DISCHARGE APPARATUS

[75] Inventor: C. Paul Christensen, Greenbelt, Md.

[73] Assignee: Potomac Photonics, Inc., Lanham, Md.

[21] Appl. No.: 524,302

[22] Filed: May 17, 1990

[51] Int. Cl.⁵ .................. H01S 3/036; H01S 3/038
[52] U.S. Cl. ........................... 372/61; 372/57; 372/87; 372/88; 313/635; 428/432; 501/40
[58] Field of Search ............... 372/57, 61, 36, 87, 372/88, 82, 83, 84; 350/96.29, 96.34, 96.30; 313/631, 635, 636, 637; 501/40; 428/432, 433

[56] References Cited

U.S. PATENT DOCUMENTS

| | | | |
|---|---|---|---|
| 4,631,732 | 12/1986 | Christensen | 372/87 |
| 4,796,271 | 1/1989 | Christensen, Jr. et al. | 372/57 |
| 4,891,818 | 1/1990 | Levatter | 372/57 |

Primary Examiner—William L. Sikes
Assistant Examiner—Galen J. Hansen
Attorney, Agent, or Firm—Wegner, Cantor, Mueller & Player

[57] ABSTRACT

Discharge tubes formed of metal fluoride gases are used in apparatus for emitting high frequency laser and fluorescent light. The discharge tubes are resistant to corrosion from halogen-containing gas mixtures subjected to high frequency excitation in the apparatus.

21 Claims, 3 Drawing Sheets

HALOGEN-COMPATIBLE HIGH-FREQUENCY DISCHARGE APPARATUS

The present invention was developed in conjunction with contract No. F49620-88-C-0092 awarded by the U.S. Air Force.

BACKGROUND OF THE INVENTION

Several are capable of efficient emission of laser and fluorescent light in the ultraviolet portion of the spectrum contain chemically reactive halogen species such as fluorine or chlorine. High-frequency excitation of these halogen-containing gas is desirable since it does not require the use of chemically-reactive metal electrodes inside the discharge tube. However, it is necessary to fabricate the discharge tube itself from halogen-compatible materials in order to achieve long operating lifetimes from these devices.

Gas discharge tubes in which optically-emitting gases are excited by high frequency (10 MHz to 10 GHz) electromagnetic fields are used in many types of lasers and lamps. Christensen (U.S. Pat. Nos. 4,631,732; 4,789,909; 4,796,271) and Harris and Young (U.S. Pat. No. 4,802,183) have disclosed high frequency discharge devices suitable for excitation of rare gas halide excimer laser systems. The disclosures of these patents are incorporated herein by reference. Kumagai and Obara (Applied Physics Letters, 54,2619 (1989)) have described high efficiency lamps utilizing rare gas/halogen mixtures. In this prior art the gas mixtures were contained in a dielectric discharge tube fabricated from borosilicate glass and fused quartz materials or aluminum oxide. Although glass and fused quartz materials can be formed and shaped by conventional glassworking techniques, they are etched and corroded by the halogen discharge plasmas, particularly those containing fluorine. Aluminum oxide is more chemically resistant to the halogen discharge plasma, but it is difficult to form and shape due to its extreme hardness and high melting point.

SUMMARY OF THE INVENTION

The present invention utilizes glass materials composed of vitreous metal fluoride compounds, hereafter referred to as metal fluoride glass, in combination with a high-frequency electromagnetic structure in construction of a gas discharge tube that is chemically compatible with a halogen discharge environment.

DETAILED DESCRIPTION OF THE PREFERRED EMBODIMENTS

Figure 1A:
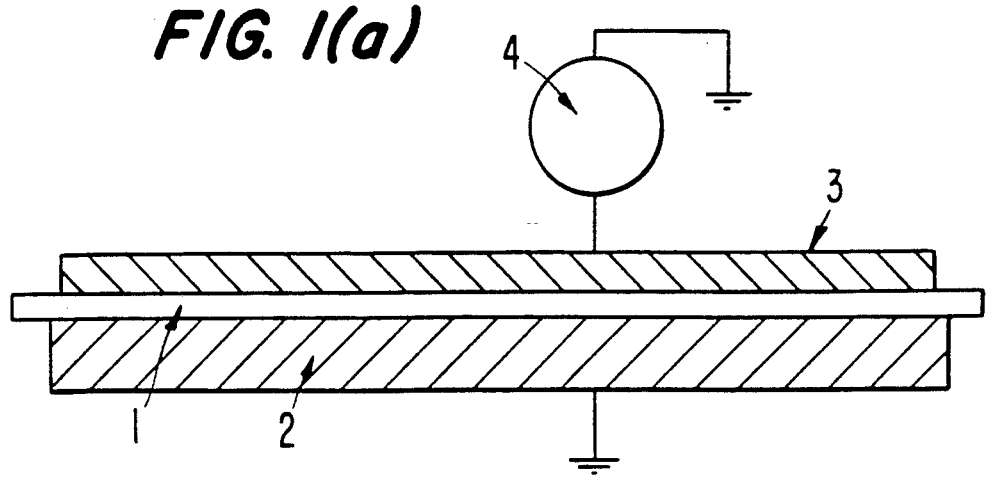
FIG. 1a is a side elevational view of a high-frequency discharge tube in accordance with first preferred embodiment of the invention.

Halogen compatibility of a gas discharge apparatus requires that all surfaces of the structure exposed to the halogen bearing gas be chemically inert to the unexcited gas. Halogen-bearing molecules of interest may be, for example, fluorine, chlorine, hydrogen chloride, or similar corrosive compounds. Surfaces exposed to the discharge plasma must also resist erosion from bombardment by energetic ion species and chemical attack by the very reactive halogen atoms, ions, and radicals produced in the discharge.

Several common structural materials can be used for those portions of the discharge tube that are not in contact with the plasma. For example, in the absence of water, silicon dioxide reacts very slowly with fluorine. In addition, several metals such as copper and nickel form a metal halide surface film that serves to passivate the surface and prevent further chemical reaction. Fluorine atoms and ions generated by a discharge plasma however. will often attack these materials. Compounds that will withstand the fluorine plasma tend to be those which are fully fluorinated. Crystalline metal halides exhibit the required chemical inertness, but are expensive and difficult to form in many of the shapes needed for high-frequency discharge applications.

Some metal halides and several metal halide mixtures can be produced in a vitreous state that exhibits many of the desired chemical characteristics and is easily shaped. Vitreous halide technology has been reviewed in Baldwin, et al. (Journal of Noncrystalline Solids 43,309 (1981)), and the use of heavy metal fluoride glass for fabrication of optical fibers has been described in detail by France, et al. ("Fluoride Glass Optical Fibers" (CRC Press, Boca Raton, Florida, 1989)). Commonly available fluoride glasses are composed of a mixture of fluorides of zirconium, barium, sodium, aluminum, and lanthanum, however, a number of other metal fluorides may be used for glass synthesis. These metal fluoride glasses are characterized by melting temperatures in the range of 250 to 500 degrees Centigrade and can be formed and shaped by conventional glass working techniques such as drawing and molding. They have been used for fabrication of optical fibers, optically transmitting windows, and as solid state host materials for infrared laser devices as described by France, et al.

Metal fluoride glasses have been considered to be of special interest in the field of optical fibers as materials for ultra-low loss fibers. However, a number of metal fluoride glass systems show light scattering due to crystallites formed in the glass, limiting their utility as fiber materials. This disadvantage is not as significant in the context of the present invention; therefore metal fluoride glasses which were not found suitable for use in fibers can be useful in the present invention. Thus, the present invention is not limited to any particular glass, but rather is useful with a wide variety of metal fluoride glasses.

Examples of suitable metal fluoride glass systems useful in the present invention include glasses which are predominantly zirconium fluoride (about 40-70% by weight) and barium fluoride (about 15-40% by weight), with lesser amounts (up to about 10% by weight each) of other metal fluorides such as Group IA fluorides (e.g. sodium, cesium and/or lithium fluorides), Group IIA fluorides (e.g. beryllium and/or magnesium fluorides), Group IVB metal fluorides (e.g. hafnium fluoride), lanthanide fluorides (e.g. lanthanum and/or gadolinium fluorides), aluminum fluoride, bismuth fluoride, lead fluoride and yttrium fluoride. Minor amounts of impurities can be tolerated, such as halogen impurities. One family of glasses useful in the present invention is the "ZBLAN" glasses, which include fluorides of zirconium, barium, lanthanum, aluminum and sodium. Another useful glass is formed primarily of zirconium fluoride, with lesser amounts of barium and sodium fluorides. The metal fluoride glasses useful in this invention can be formed from appropriate fluoride and oxide starting materials by conventional processes.

Figure 1B:
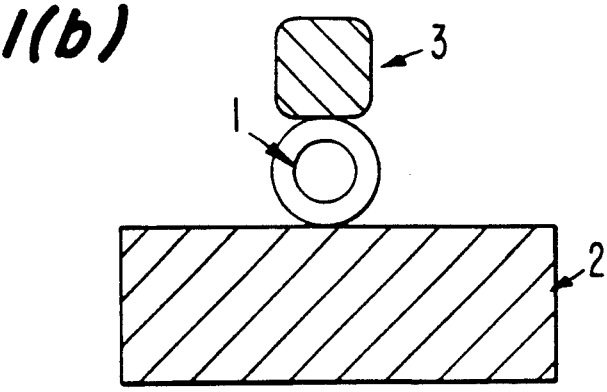
FIG. 1b is a cross-sectional view of the first preferred embodiment.

This invention uses metal fluoride glass components in combination with high-frequency discharge techniques to produce a halogen-compatible discharge structure. FIGS. 1a and 1b illustrate a first preferred embodiment in accordance with the invention. Throughout the figures, like numerals are used to indicate like elements. A metal fluoride glass tube 1 is positioned between electrodes 2 and 3. During operation, a generator 4 applies a high-frequency (10 MHz to 10 GHz) voltage to electrodes 2 and 3, producing a high-frequency glass discharge tube 1. Halogen-bearing gas mixtures contained within the tube are ionized and electrically discharged by the high-frequency field to produce fluorescence and/or optical gain.

When the frequency of the electromagnetic field is such that the length of the electrodes 2 and 3 exceed one quarter of the electromagnetic wavelength, electrodes 2 and 3 act as an electromagnetic waveguiding structure similar to that disclosed by Christensen in U.S. Pat. 4,631,732. Waveguides of this type are known in the microwave engineering art as microstrip waveguides.

Since many metal fluoride glasses ar characterized by low thermal conductivity, it is sometimes desirable to fabricate the metal fluoride glass tube with thin walls and utilize one or more overlayers or coatings of higher thermal conductivity material to more rapidly transfer heat away from the discharge region. The resulting composite tube structure exhibits the chemical inertness of the metal fluoride glass material, with thermal conductivity comparable to that of the overlayer. Similar composite configurations may also be used to improve the mechanical strength and rigidity of the discharge structure.

Figure 2:
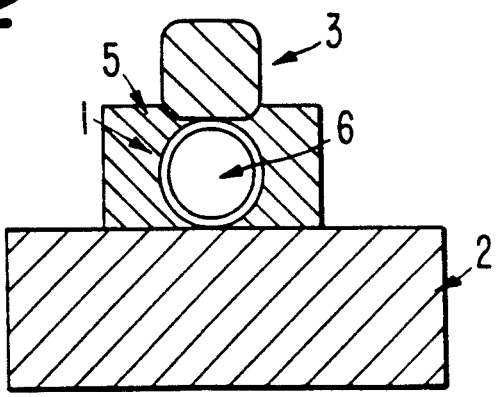
FIG. 2 is a cross-sectional view of a second preferred embodiment showing the use of an encapsulating material to improve the strength and rigidity of the tube and to assist in conduction of heat away from the discharge region.

FIG. 2 shows a second preferred embodiment in which the metal fluoride glass discharge tube 1 is embedded in a second dielectric material 5 with high thermal conductivity to form a composite structure capable of improved heat transfer from the discharge region 6 to electrodes 2 and 3. Composite configurations like those shown in FIG. 2 can be fabricated by embedding a metal fluoride tube in a castable ceramic, glass, or organic material or by applying a fluoride glass coating to the inside of a tube fabricated from suitable materials like aluminum oxide or beryllium oxide.

Figure 3A:
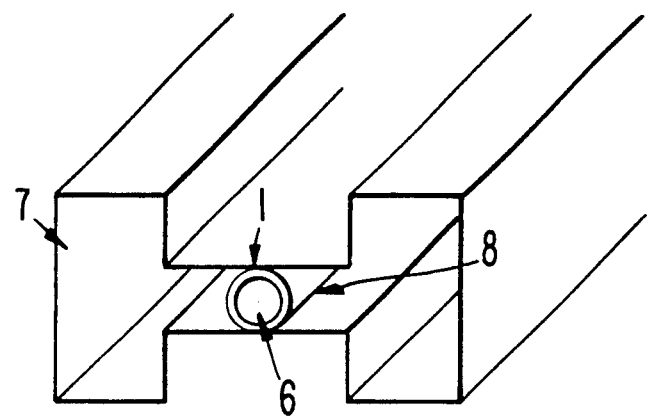
FIG. 3a is a cross-sectional view of a high-frequency discharge tube in accordance with a third preferred embodiment of the invention showing the metal fluoride glass tube placed in a high-frequency electromagnetic waveguide.

Means other than those shown in FIGS. 1 and 2 may be used to apply the high frequency field to gases contained by the discharge tube. FIG. 3a shows a third embodiment in which discharge tube 1 is placed within a hollow metallic waveguide 7 of the type commonly used in the microwave art. The waveguide confines the high-frequency electromagnetic waves and may be shaped to increase their amplitude in a region 8 containing the discharge tube. During operation, high-frequency fields are produced and propagated through the waveguide using techniques well-known in the microwave art. The guided high-frequency fields penetrate the discharge tube 1 and excite gases contained in the plasma region 6.

Figure 3B:
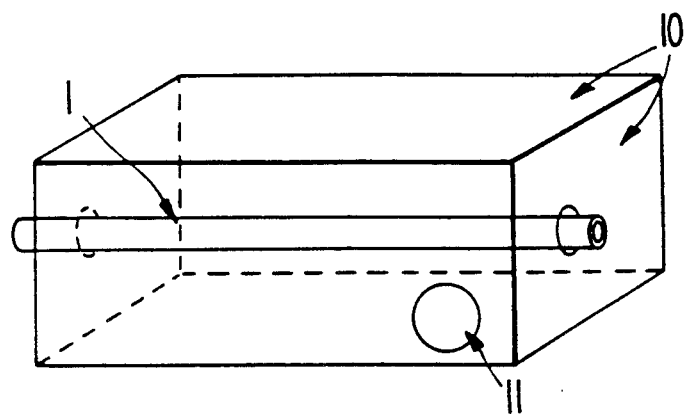
FIG. 3b is a perspective view of a high-frequency discharge tube in accordance with a fourth preferred embodiment of the invention showing the metal fluoride glass tube placed in a resonant electromagnetic cavity.

FIG. 3b shows the use of an elect electromagnetic cavity for confining and enhancing the electromagnetic field in the region occupied by the discharge tube. If the discharge tube is enclosed on all sides by electrically conducting walls 10, and electromagnetic power is introduced into the conducting structure through a port 11, the structure will exhibit electromagnetic resonances at specific frequencies determined by its size and shape, as is well-known in the microwave art. At resonance, the amplitude of the electromagnetic fields within the structure will substantially increase and allow electrical discharge of the gas contained by the fluoride glass discharge tube 1. Although a rectangular electromagnetic cavity is shown in FIG. 3b, obviously other shapes may be used which enhance the efficiency or the spatial characteristics of optical emission from the discharge tube 1.

Figure 4A:
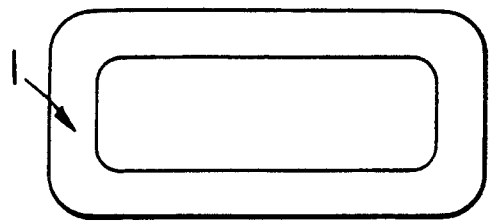
FIG. 4a is a cross-sectional view of an alternate geometry for the metal fluoride glass tube in which the tube bore is rectangular.
Figure 4B:
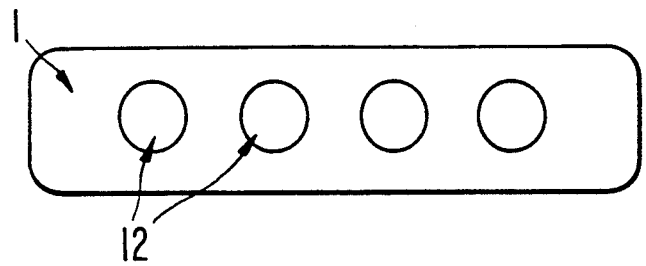
FIG. 4b is a cross-sectional view of an alternate geometry for the metal fluoride glass tube in which the tube has multiple bores.
Figure 4C:
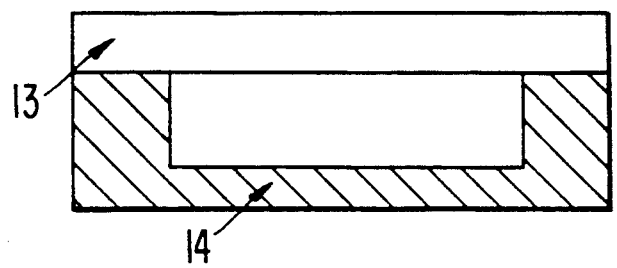
FIG. 4c is a cross-sectional view of an alternate geometry for the discharge tube in which three walls of the tube are fabricated from a ceramic or halogen-compatible metal and a fourth wall is fabricated from metal fluoride glass.

The discharge tube 1 may be fabricated in a variety of geometries within the scope of the invention. FIG. 4a is a cross-sectional view of a discharge structure in which the discharge tube 1 has a rectangular cross-section. Many other geometries may be found to be useful for various applications. For example, a spherical geometry may be useful in lamps. FIG. 4b shows a cross-section of a discharge tube l characterized by multiple inner bores 12. In addition, not all of the discharge tube need be constructed of metal fluoride glass. In laser applications, for example, it may be desirable to construct the discharge tube such that two opposing end walls that are not in direct contact with the discharge plasma are fabricated from a suitable optically-transmitting material such as quartz. Alternatively, it may be desirable to utilize halogen-compatible ceramics or metals in construction of portions of the discharge tube. FIG. 4c shows a cross-sectional view of a discharge tube in which one of the tube walls 13 is fabricated from metal fluoride glass and the remaining walls 14 are fabricated from a halogen-compatible material such as aluminum oxide.

Also, it is often desirable to use some type of preionization technique that produces a low level of ionization in the discharge region prior to application of the high frequency field. This assures that the gas discharges predictably and reliably. Weak ac discharge is one suitable preionization technique. Other preionization techniques used in this field also are useful with the present invention.

EXAMPLE

Using a discharge configuration similar to that shown in FIG. 1, 248 nm fluorescence emission has been produced from the krypton fluoride excimer molecule by pulsed 3 GHz discharge excitation of a mixture of helium, krypton, and fluorine gases slowly flowing through a cylindrical metal fluoride glass discharge tube. The side walls of the discharge tube were fabricated from a metal fluoride glass composed primarily of zirconium fluoride, with lesser amounts of barium and sodium fluorides. The two end walls were constructed of silicon dioxide. The discharge tube was 20 cm in length with a 0.5 mm bore with access ports near the end walls for connection to a gas supply. A weak ac discharge at 300 kHz was used in a short portion near one end of the discharge tube for preionization. Repetitive pulsing of the discharge at 1,000 pulses per second for periods exceeding 100 hours produced little evidence of corrosion of the discharge tube by the discharge gases or plasma. When the outer surface of the silicon dioxide end walls was dielectrically coated for high reflectivity at 248 nm, krypton fluoride laser emission at 248 nm was emitted through the silicon dioxide end walls.

This description of preferred embodiments is for illustrative purposes only. Modifications can be made within the scope of the invention as defined by the appended claims.

What is claimed is:

1. A high-frequency discharge apparatus comprising:
   a discharge tube, at least one wall surface of which is composed of a vitreous metal fluoride glass; and
   means for generating a high-frequency electromagnetic field within said discharge tube.

2. An apparatus as in claim 1 in which said discharge tube is embedded in a dielectric material.

3. A high-frequency discharge apparatus comprising:
   a discharge tube, at least one wall surface of which is composed of a metal fluoride glass; and
   means for generating a high-frequency electromagnetic field within said discharge tube,
   in which said at least one wall surface of said discharge tube is formed by applying a coating off metal fluoride glass to an electrically conducting or nonconducting material.

4. An apparatus as in claim 1 in which said discharge tube has multiple inner bores.

5. An apparatus as in claim 1 in which said means for generating a high-frequency electromagnetic field comprises two metal electrodes external to said discharge tube.

6. An apparatus as in claim 2 in which said means for generating a high-frequency electromagnetic field comprises two metal electrodes external to said discharge tube.

7. An apparatus as in claim 3 in which said means for generating a high-frequency electromagnetic field comprises two metal electrodes external to said discharge tube.

8. An apparatus as in claim 4 in which said means for generating a high-frequency electromagnetic field comprises two metal electrodes external to said discharge tube.

9. An apparatus as in claim 1 in which said means for generating a high-frequency electromagnetic field comprises a hollow metal waveguide.

10. An apparatus as in claim 2 in which said means for generating a high-frequency electromagnetic field comprises a hollow metal waveguide.

11. An apparatus as in claim 3 in which said means for generating a high-frequency electromagnetic field comprises a hollow metal waveguide.

12. An apparatus as in claim 4 in which said means for generating a high-frequency electromagnetic field comprises a hollow metal waveguide.

13. An apparatus as in claim in which said means for generating a high-frequency electromagnetic field comprises a resonant electromagnetic cavity.

14. An apparatus as in claim 2 in which said means for generating high-frequency electromagnetic field comprises a resonant electromagnetic cavity.

15. An apparatus as in claim 3 in which said means for generating a high-frequency electromagnetic field comprises a resonant electromagnetic cavity.

16. An apparatus as in claim 4 in which said means for generating a high-frequency electromagnetic field comprises a resonant electromagnetic cavity.

17. An apparatus as in claim 1, wherein the high frequency is in the range of 10 MHz to 10 GHz.

18. An apparatus as in claim 1, which further comprises means for supplying a gas comprising halogen-bearing molecules to the discharge tube.

19. An apparatus as in claim 1, wherein the metal fluoride glass comprises vitreous zirconium fluoride and barium fluoride.

20. An apparatus as in claim 1, wherein the metal fluoride glass comprises barium fluoride.

21. The apparatus as in claim 19, wherein the metal fluoride glass comprises 40–70% by weight of zirconium fluoride and 15–40% by weight of barium fluoride and up to 10% by weight each of one or more members selected from the group consisting of Group IA fluorides, Group IIA fluorides, Group IVB fluorides, lanthanide fluorides, aluminum fluoride, bismuth fluoride, lead fluoride and yttrium fluoride.

* * * * *